United States Patent [19]
Rienzo, Sr.

[11] 4,011,680
[45] Mar. 15, 1977

[54] LINE GUIDE FOR A FISHING ROD

[75] Inventor: Donald D. Rienzo, Sr., Hicksville, N.Y.

[73] Assignee: Allan Tackle Manufacturing Co., Inc., Hicksville, N.Y.

[22] Filed: Oct. 31, 1975

[21] Appl. No.: 627,519

[52] U.S. Cl. .................................................. 43/24
[51] Int. Cl.² ...................................... A01K 87/04
[58] Field of Search ........................................ 43/24

[56] References Cited

UNITED STATES PATENTS

| 1,923,263 | 8/1933 | Heddon | 43/24 |
| 1,984,349 | 12/1934 | Gurrieri et al. | 43/24 |
| 1,993,342 | 3/1935 | Gurrieri et al. | 43/24 |
| 2,146,964 | 2/1939 | Legat | 43/24 X |
| 3,171,228 | 3/1965 | Cwik | 43/24 |

FOREIGN PATENTS OR APPLICATIONS

| 1,132,624 | 11/1968 | United Kingdom | 43/24 |

*Primary Examiner*—Louis G. Mancene
*Assistant Examiner*—Daniel J. Leach
*Attorney, Agent, or Firm*—Hane, Sullivan & Spiecens

[57] ABSTRACT

A line guide for a fishing rod which consists of a guide ring material essentially consisting of titanium with ceramic as a binder and which is fitted within a ring made of hard metal and mounted to a support for attachment to a fishing rod.

7 Claims, 5 Drawing Figures

U.S. Patent  Mar. 15, 1977  4,011,680
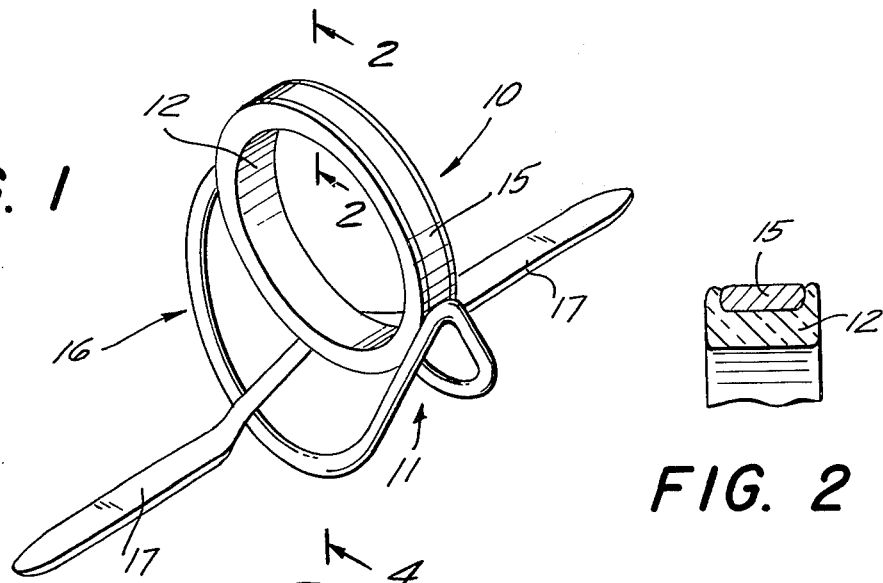
FIG. 1
FIG. 2
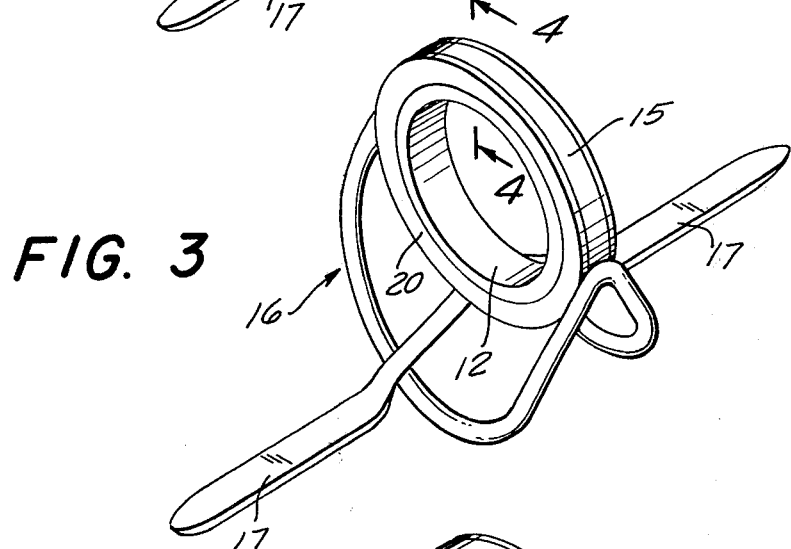
FIG. 3
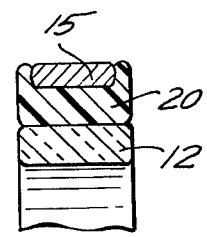
FIG. 4
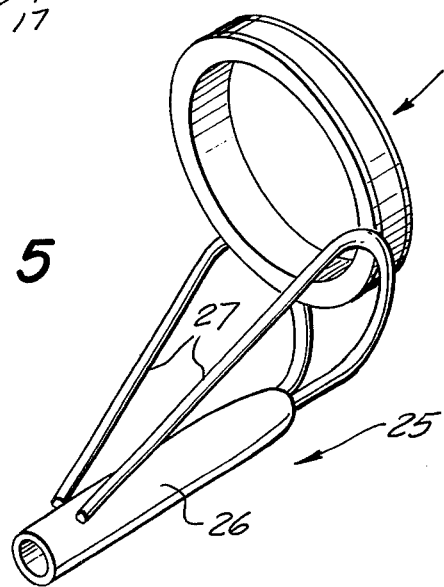
FIG. 5

LINE GUIDE FOR A FISHING ROD

The present invention relates to a line guide attachable either to the length of a fishing rod or to the top thereof, and more particularly to the guide ring of such line guide.

BACKGROUND

Line guides of the type above referred to serve to guide the fishing line along the rod and at its top so that the line can be let out and reeled in without becoming entangled with the rod itself or otherwise. The fishing line is generally in contact with the inner surface of the guide ring of line guides. This contact may be a pressure contact, for instance, when a heavy sinker is attached to the hook carrying end of the line or a caught fish is played. The passage speed of the line through the guide ring of a line may be slow, for instance, when the fisherman just lets out the line until the bait reaches bottom or very fast when the fisherman is casting or plays a caught fish.

As it is evident from the afore-listed conditions under which a fishing line functions, the friction between the line and the running surface of the line guides is a significant factor largely controlling the useful lifetime of the line and in particular its resistance to snapping under strain. The friction factor is particularly important as the smoothness of the line surface ring may be restricted by sand or dirt particles adhering to the line. Snapping of the line while in use is not only annoying to the fisherman, but may also be quite costly.

Various attempts have been made to reduce the friction between the line and the ring of a line guide to a minimum, both as to the shape of the guide ring and the material used for its running surface. There are known line guides of rectangular configuration to provide a relatively large and flat running surface to avoid the formation of grooves in the inner ring surface as may occur when the line is confined to narrow running surfaces but line guides so shaped have relatively sharp edges even if these edges are rounded and friction is substantially increased when the line, due to the pull direction, contacts an edge under pressure. Most line guides as now used have a circular, or at least substantially circular, configuration. Such line guides have no flat running surfaces but they also do not have edges.

Various attempts have also been made to provide material for the rings of line guides which has a low friction factor, is sufficiently hard to avoid or at least reduce the formation of scratches and grooves by abrasive particles carried by the line and is not sensitive to corrosion by salt water. For instance, several types of alumina have been used for guide rings.

THE INVENTION

It is a broad object of the invention to provide a novel and improved line guide which has a low friction, is highly resistant to the abrasive action of particles adhering to a fishing line and also to corrosion by salt water, has a relatively low expansion factor and can be produced by typical mass production techniques.

A more specific object of the invention is to provide a novel and improved line guide in which a ring essentially consisting of titanium dioxide with ceramic as a binder defining the running surface is tightly fitted in a metal ring thereby protecting the ceramic ring against breakage and facilitating attachment of the line guides to the length of the rod or its top.

A still more specific object of the invention is to provide a novel and improved line guide in which a cushioned layer is interposed between the ceramic ring and the framing metal ring thereby further protecting the ceramic ring and thus prolonging the useful life thereof.

Another further object of the invention is to incorporate in the ceramic material of which the guide ring is formed, a lubricating agent thereby still more reducing the friction factor of the ceramic material.

BRIEF DESCRIPTION OF THE DRAWING

In the accompanying drawing several embodiments of the invention are shown by way of illustration and not by way of limitation.

In the drawing:

FIG. 1 is a perspective view of a line guide according to the invention;

FIG. 2 is a cross section taken on line 2—2 of FIG. 1 on an enlarged scale;

FIG. 3 is a perspective view of a modification of the line guide according to FIG. 1;

FIG. 4 is a section taken on line 4—4 of FIG. 3 on an enlarged scale; and

FIG. 5 is another modification of the line guide according to FIG. 1.

DETAILED DESCRIPTION OF THE DRAWING

Referring more in detail to the drawing figures and first to FIGS. 1 and 2, the line guide as shown comprises a guide ring 10 and a cradle 11 for supporting the guide ring. The guide ring is composed of an inner ring 12 essentially consisting of titanium and, preferably, of titanium dioxide ($TiO_2$) with ceramic as a binder. To increase the smoothness of the running surface carbon may be admixed to the ceramic material forming ring 12. Such admixture has a lubricating effect and also hardens the ring material. Ring 12 is shown as having a substantially rectangular cross section with rounded edges, but it may also have a more curved configuration on its inwardly facing surface to reduce friction between the fishing line, which is usually made of a plastic such as nylon, and the surface of the ring. It is also possible and sometimes advantageous to give ring 12 an oval configuration rather than the illustrated circular configuration.

Ring 12 is mounted within a surrounding band 15 into which it is tightly fitted to protect the ring against damage. The ring formed by the band is made of suitable metal such as hard aluminum or stainless steel. The thus jacketed guide ring is secured to a cradle 16. This cradle has two legs 17 by means of which the entire assembly can be conveniently secured to a fishing rod generally by tightly winding thread about the rod proper and legs 17.

The line guide according to FIGS. 3 and 4 is similar to the line guide as described in connection with FIGS. 1 and 2 except that a cushioning or shock damping ring 20 is interposed between the ring 12 and mounting band 15. This cushioning ring may be made of any suitable flexible material such as rubber or nylon, preferably nylon 66. It serves the purpose of prolonging the useful life of the ceramic ring by absorbing impacts upon the ring, for instance when the line is heavily pulled against the ceramic ring.

The guide ring of FIG. 3 is also secured to the cradle 16 as shown in FIG. 1.

FIG. 5 shows a guide ring as described in connection with FIG. 1, i.e., a ring which is composed of ceramic ring 12 jacketed by a metal band 15. However, the ring of FIG. 5 is secured to a frame 25 which includes a hollow tube 26 mounting the ring proper by means of brackets 27. The line guide of FIG. 5 is intended to be secured to the top of a fishing rod. Of course, instead of the guide ring according to FIG. 1, the ring of FIG. 3 could be used in connection with the frame as shown in FIG. 5.

A subsequent tabulation indicating performance data of guide rings made of titanium dioxide and several kinds of alumina as are frequently used for making the guide ring surface of line guides shows clearly the surprising superiority of titanium dioxide rings over alumina as widely used for such rings.

| PROPERTIES | | TITANIA | ALUMINA | | |
|---|---|---|---|---|---|
| PROPERTY | UNIT | $TiO_2$ | 85% $Al_2O_3$ | 96% $Al_2O_3$ | 98% $Al_2O_3$ |
| Water absorption | % | 0 Impervious | 0 Impervious | 0 Impervious | 0 Impervious |
| Specific gravity | — | 4.0 | 3.40 | 3.69 | 3.73 |
| Density | lbs./cu.in. | .143 | .122 | .134 | .134 |
| Safe temperature continuous | °C | 1000 | 1100 | 1550 | 1600 |
|  | °F | 1832 | 2012 | 2820 | 2900 |
| Hardness | Mohs'Scale | 8 | 9 | 9 | 9 |
| Thermal expansion linear coefficient | °C 25–700° C | $9.0 \times 10^{-6}$ | $7.5 \times 10^{-6}$ | $7.5 \times 10^{-6}$ | $7.8 \times 10^{-6}$ |
| Tensile strength | lbs./sq.in. | 7500 | 20,000 | 24,900 | 20,000 |
| Compressive strength | lbs./sq.in. | 100,000 | 274,000 | 374,000 | 324,000 |
| Flexural strength | lbs./sq.in. | 20,000 | 35,000 | 53,000 | 48,000 |
| Resistance to impact | inch - lbs. | 6.5 | 6.2 | 7.0 | 7.4 |
| Thermal conductivity | g.cal/sec/ cm$^2$/° C/cm | .012 | .060 | .040 | — |
| Dielectric strength 60 cy AC | volts/mil. | 100 | 230 | 230 | 230 |
| Volume resistivity 500° C | ohm/cent. | $1.7 \times 10^6$ | $1.0 \times 10^8$ | $7.2 \times 10^7$ | $3.2 \times 10^{11}$ |
| Loss factor 100mc 60 cy. | — | — | .0062 | .0027 | .0018 |
| Temperature resistance- one megohm/cent.cube | °C | 520 | 800 | 840 | 1000 |
|  | °F | 968 | 1472 | 1544 | 1832 |
| Dissipation factor 100mc 60 cy.25° C | — | .0006 | .0008 | .0003 | .0002 |
| Dielectric constant 100mc 60 cy.25° C | — | 85 | 8.2 | 9.05 | 9.15 |

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A line guide for a fishing line comprising:
   a generally ring-shaped guide member made of a material consisting of titanium and ceramic as a binder, a matchingly shaped band of hard metal encompassing said guide member with a tight fit; and
   mounting means fixedly secured to said metal band for fastening the guide member and the band to a fishing rod.

2. The guide according to claim 1 wherein said guide member is a ring made of titanium dioxide ($TiO_2$).

3. The guide according to claim 2 wherein said titanium dioxide includes an admixture of carbon.

4. The guide according to claim 1 wherein said metal band is in the form of a seamless ring, and said guide member is a seamless ring of titanium and ceramic as a binder pressure fitted in said ring.

5. The guide according to claim 1 and further comprising a layer made of an elastic material and interposed between said guide member and said encompassing metal band.

6. The guide according to claim 5 wherein said layer is made of elastic synthetic plastics material.

7. The guide according to claim 6 wherein said layer consists of nylon.

* * * * *